W. P. & G. B. EVERTS.
CUSHION TIRE.
APPLICATION FILED SEPT. 10, 1907.
903,815.
Patented Nov. 10, 1908.
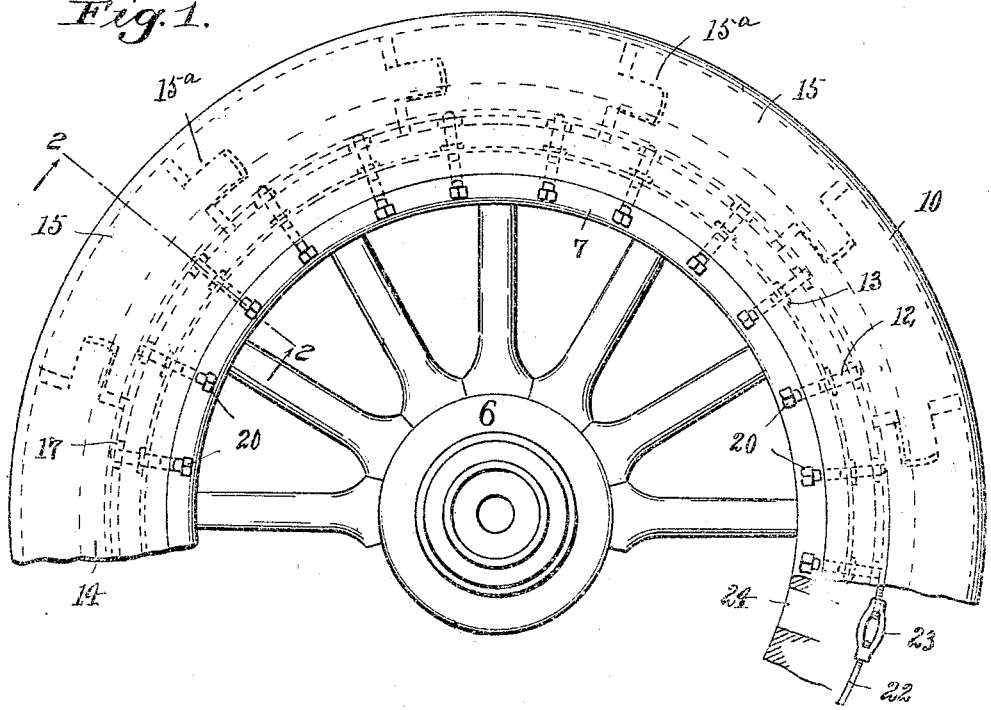
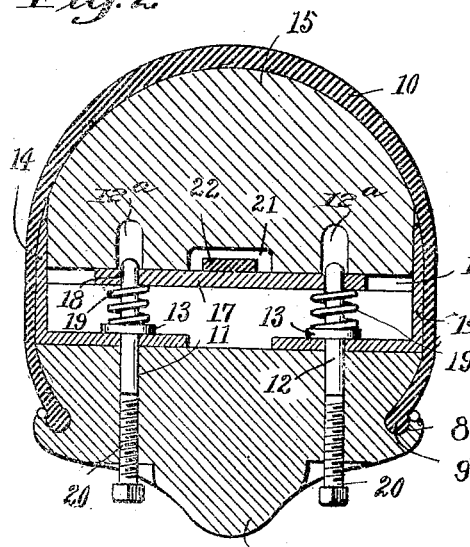
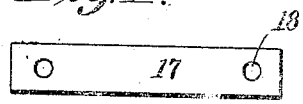
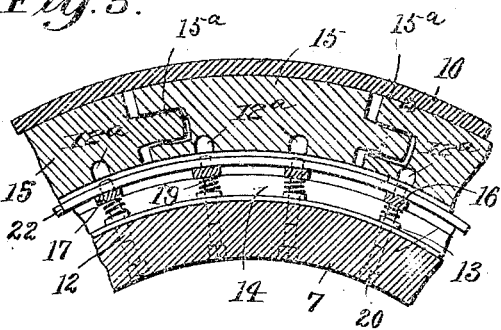
Witnesses
Howard F. Landon
Bessie P. Everts
Inventors
William P. Everts
George B. Everts
By Chamberlain & Newman
Attorneys

UNITED STATES PATENT OFFICE.

WILLIAM P. EVERTS, OF SALISBURY, AND GEORGE B. EVERTS, OF BRIDGEPORT, CONNECTICUT, WILLIAM P. EVARTS ADMINISTRATOR OF SAID GEORGE B. EVERTS, DECEASED, ASSIGNOR TO WILLIAM P. EVARTS, INDIVIDUALLY.

CUSHION-TIRE.

No. 903,815.  Specification of Letters Patent.  Patented Nov. 10, 1908.

Application filed September 10, 1907. Serial No. 392,123.

*To all whom it may concern:*

Be it known that we, WILLIAM P. EVERTS and GEORGE B. EVERTS, citizens of the United States, and residents of Salisbury, in the county of Litchfield, State of Connecticut, and Bridgeport, Fairfield county, said State, respectively, have invented certain new and useful Improvements in Cushion-Tires, of which the following is a specification.
Our invention relates to new and useful improvements in cushion tires for vehicles and especially to automobile tires.

It is the object of the invention to provide a cushion tire for the above purpose which in appearance will resemble the ordinary pneumatic tire, and be adapted for use upon wheels similar to those now commonly manufactured for automobiles; to provide a tire which in effect and operation will be somewhat like the common forms of pneumatic tires now upon the n rket, but be free from the usual annoyance and inconvenience caused by punctures, blowouts and other troubles commonly experienced with the inflated types of tires; further to provide a tire which will be comparatively inexpensive to manufacture and perfectly durable and practical in every respect; and finally to construct it in a way which will permit of its attachment and detachment to a wheel conveniently and quickly and to form a dust-proof construction.

With the above objects in view our invention resides and consists in the novel construction and combination of parts shown upon the accompanying sheet of drawing forming a part of this specification upon which similar characters of reference denote like or corresponding parts throughout the several figures and of which, Figure 1, shows a side elevation partly broken away of a wheel covered with an improved tire constructed in accordance with our invention. Fig. 2, is a transverse cross section on an enlarged scale of the tire and wheel rim shown in Fig. 1. Fig. 3, is a central vertical longitudinal section through the tire and wheel rim, and Fig. 4, is a plan view of one of the cross bars contained within the tire.
Referring in detail to the characters of reference marked upon the drawing 6 represents a wheel, which obviously may be of any of the preferred designs, 7 the rim of the wheel which is of a special construction, having an annular socket 8 on either side to receive the annular bead 9 of the outer shoe or covering 10 which may be retained therein in the usual or any preferred manner. The said rim further contains a double series of radial holes 11 in which are seated guide pins 12 having an integral annular shoulder 13 thereon that normally rests upon angle rings 14. A pair of these angle rings 14 are secured to the periphery of the rim 7 and are deflected out to form an annular flange at either side intermediate of which is seated a series of blocks 15. These blocks are preferably formed of wood, or some other light material and are pivotally jointed together as by means of a sort of tongue and groove connection 15ª. They are arranged annularly around the rim of the wheel and inclosed by the shoe 10 before mentioned. Each of the blocks in question contains a pair of transverse slots 16 in under side in which are mounted metal bars 17. The said bars are provided with a pair of holes 18 through which the outer ends of the pin 12 operate. The blocks 15 are further provided with pockets 12ª in which the ends of the pins 12 are free to operate. A spring 19 is mounted upon the inner ends of said pins intermediate of the said bars 17 and the annular shoulder 13 that rests upon the angle plates 14, in a way to normally hold the blocks 15 out snug against the shoe 10 and at the same time to permit the said block to yield against the action of the springs by pressure against the outer surface of shoe, as in the rotation of wheel over a highway under load.

We have provided means for adjusting the tension of the springs or to take up the lost motion which would be caused by the breaking of the spring, which comprises a screw 20 threadably seated in the rim of the wheel with its end abutting against the inner end 12 of said pin in a way to cause the same to be forced in by the turning of the screw to the right thus bringing the several coils of springs close together and forcing them against the bars 17 and their blocks in a way to retain the same in position.

The several blocks 15 are provided with a longitudinal recess 21 upon their inner face through which a strap 22 is threaded for the engagement of the bar 17 in a way to retain the same in position upon the springs as for instance in assembling or when the shoe is removed for any other purpose. The ends of the said strap may be rounded and threaded to receive a turn buckle 23 as shown in Fig. 1, to provide an adjustment of the cross bars 17 upon the springs 19 and to afford means for regulating the pressure of the springs upon the said blocks and the shoe when assembled. The rim of the wheel may be provided with an aperture 24 by means of which access may be had to the turn buckle 23 from the inner surface of the wheel rim, so as to adjust the tire after the shoe has been applied if desired. Any suitable covering (not shown) may be used to close the aperture to form a suitable dust-proof construction.

In the operation of a wheel constructed in accordance with our invention it will be obvious that the blocks, each of which is independently supported by two cross bars and four springs, are adapted to yield in toward the hub when under load, against the action of the springs, allowing the shoe to conform in a measure to the movement of the block in a way to accommodate small obstructions on the roadway and to insure an even and uniform movement of the wheel. The successive blocks obviously move and operate in their respective orders with the rotation of the wheel under load, by yielding more or less according to the surface of the road bed and the load under which they are operating in a way to afford a continuous operation of the tire as a whole, which operation in effect, is very similar to that of the present form of inflated automobile tires now in use.

A tire constructed in accord with our invention is durable, practical and affords an easy riding wheel which should give little or no trouble and is what may be termed a perfectly dust-proof construction since as will be noted the several parts of the tire are entirely inclosed by the outer shoe.

Having thus described our invention what we claim and desire to secure by Letters Patent is:—

1. In a tire of the class described, the combination with a wheel rim, of a series of radially disposed springs mounted thereon, cross bars to engage the springs, blocks mounted upon bars, and a strap to encircle and retain the bars upon the springs.

2. In a tire of the class described, the combination with a wheel rim, of a series of radially disposed springs mounted thereon, cross bars to engage the springs, blocks mounted upon bars, a strap to encircle and retain the parts upon the springs and means for adjusting said strap to regulate the tension of the springs.

3. In a tire of the class described, the combination with a wheel rim, of a series of radially disposed springs mounted thereon, cross bars to engage the springs, blocks mounted upon the bars, a strap to encircle and retain the parts upon the springs, and a detachable shoe inclosing said springs, bars and blocks.

4. The combination with a wheel rim having a series of radial holes therein, shouldered pins mounted in said holes, screws for adjusting the said shouldered pins, cross bars slidably mounted upon said pins, springs situated intermediate of the shoulder of the pins and the cross bar to normally hold the same distended from the rim, blocks mounted upon the cross bars and means for yieldably holding the blocks in position upon the bars.

Signed at Salisbury in the county of Litchfield and State of Connecticut this 24th day of August, A. D., 1907.

WILLIAM P. EVERTS.
GEORGE B. EVERTS.

Witnesses:
HOWARD F. LANDON,
BESSIE T. EVERTS.